United States Patent
Murphy et al.

(10) Patent No.: US 7,159,234 B1
(45) Date of Patent: Jan. 2, 2007

(54) SYSTEM AND METHOD FOR STREAMING MEDIA SERVER SINGLE FRAME FAILOVER

(76) Inventors: Craig Murphy, 7614 130th Ave., NE., Kirkland, WA (US) 98033; Richard T. Oesterreicher, 3871 Midshore Dr., Naples, FL (US) 34109; Dan Teifke, 17110 105th Ave., NE., Bothell, WA (US) 98011

(*) Notice: Subject to any disclaimer, the term of this patent is extended or adjusted under 35 U.S.C. 154(b) by 530 days.

(21) Appl. No.: 10/609,432

(22) Filed: Jun. 27, 2003

(51) Int. Cl.
*G06F 11/00* (2006.01)

(52) U.S. Cl. .............................. 725/87; 725/94; 714/4; 714/5; 714/6; 714/11

(58) Field of Classification Search .................... 714/6, 714/12, 13, 4, 11; 725/93, 144, 87
See application file for complete search history.

(56) References Cited

U.S. PATENT DOCUMENTS

| | | | |
|---|---|---|---|
| 6,378,129 B1 * | 4/2002 | Zetts | 725/94 |
| 6,745,303 B1 * | 6/2004 | Watanabe | 711/161 |
| 6,823,349 B1 * | 11/2004 | Taylor et al. | 707/204 |
| 6,922,793 B1 * | 7/2005 | Lin et al. | 714/12 |
| 6,988,166 B1 * | 1/2006 | Young | 711/114 |

OTHER PUBLICATIONS

"Kernel (Computer Science)" Wikipedia Online Encyclopedia. www.wikipedia.com.*

* cited by examiner

*Primary Examiner*—Bryce Bonzo
*Assistant Examiner*—Matthew Urick
(74) *Attorney, Agent, or Firm*—Woodcock Washburn LLP (57) ABSTRACT

Systems, methods, and computer readable media are provided for very fast failover of streaming media servers. Fast failover allows for better quality of service. If a first server that is streaming media to a customer fails, a second server can continue operations in its place. Single frame failover can be accomplished by simultaneously streaming a digital asset by a first server and a second server. The second server flags each frame of the asset for discard, and meanwhile monitors the first server to ensure the first server is operational. Upon detecting a failure in the first server, the second server stops flagging frames for discard.

35 Claims, 10 Drawing Sheets

SYSTEM AND METHOD FOR STREAMING MEDIA SERVER SINGLE FRAME FAILOVER

FIELD OF THE INVENTION

This invention relates to the field of fault-tolerant systems and, in particular, to the field of fault-tolerant digital media systems.

BACKGROUND OF THE INVENTION

As the number of subscribers for video-on-demand (VOD) services continues to grow, consistent and dependable delivery of such services becomes critical. One common mechanism for ensuring that data transmissions are not interrupted by server failure is known in the art as "failover." Failover refers generally to the technique of automatically switching to a backup server when a primary server fails. Failover is an important fault-tolerance feature of systems that must be constantly available such as email systems and database servers.

Systems with failover capability typically group servers into failover pairs. Each failover pair includes a primary server that is active and a secondary server that is brought online only when a failover occurs. Other designations used interchangeably to refer to the primary and secondary servers are master and slave, active and standby, and primary and backup.

Although vendors often assert that their failover systems provide "instant" or "immediate" failover, these systems typically initiate a failover seconds or even minutes after a failure occurs. For many types of applications this delay is acceptable. For example, a delay of several seconds will typically go unnoticed by users accessing a database or email server due to the non-time-sensitive nature of the data being accessed. But such delays cannot be tolerated by providers of premium digital-media services.

For example, suppose a customer accesses a VOD service provided by a local cable television provider. The cable television provider will typically employ a plurality of digital media servers to provide VOD services to its customers. If any VOD server currently delivering content experiences a catastrophic failure and goes offline, the movie is disrupted and the customer's movie viewing experience is unsatisfactory.

Moreover, due to the enormous storage requirements and time-sensitive nature of delivering digital media, the process of failover for a digital media server is far more complex to implement than that of a database or Web server. The growth of VOD, subscription VOD (SVOD), and everything-on-demand (EOD) services, combined with the growing subscriber density served by each digital media server, requires stricter fault tolerance levels for asset availability.

SUMMARY OF THE INVENTION

A system and method for providing failover capability is disclosed. In a preferred embodiment, a plurality of digital media servers are divided into failover pairs. In each pair, one server is designated as the primary server, and one server is designated as the secondary server. The secondary server preferably maintains up-to-date asset and other information that mirrors the primary server.

The operational status of the primary server is preferably verified on a continuing basis using one or more techniques which may include local monitoring by the primary server of critical processes and remote monitoring of a periodic "heartbeat" generated by the server. The heartbeat frequency is preferably greater than the session's interval rate. If the primary server is operating correctly, it's output is streamed to the user and the second server's output is discarded. If, however, the primary server is not operating correctly, a failover is triggered and the second server takes over delivery of the data to the user.

Because the secondary server mirrors the primary server's operational state and processes asset requests in parallel with the primary server, and because the primary server is continuously monitored for failures that may affect its ability to deliver requested data to the client, the present system and method can transfer all functionality (including asset access and serving functions) from a primary server to a secondary server in less than one video frame. Consequently, the present system and method eliminates virtually all disruption of service to a VOD customer that might otherwise be experienced due to server failure.

In one aspect, the present invention is directed to a method for data delivery comprising a first server computer connected to a first network, a second server computer connected to the first network, said first and second servers being interconnected via a second network, the method comprising:
  synchronizing parameters of the first and second server computers;
  receiving an asset request from a user via the first network;
  processing the asset request by the first and second server computers;
  determining the operational status of the first server computer, wherein
  if a failure is not detected, transmitting the asset by the first server via the first network,
  if a failure is detected, transmitting the asset by the second server via the first network.

In another aspect of the present invention, the method further comprises the steps of detecting a failure and transmitting the asset by the second server computer via the first network being performed within one interval.

In another aspect of the present invention, the method further comprises the interval being one video frame in duration.

In another aspect of the present invention, the method further comprises the second server computer initiating data synchronization.

In another aspect of the present invention, the method further comprises the first server computer initiating data synchronization.

In another aspect of the present invention, the method further comprises a synchronization component initiating data synchronization.

In another aspect of the present invention, the method further comprises wherein the step of detecting a failure comprises monitoring a plurality of signals transmitted by the first server computer during one interval.

In another aspect of the present invention, the method further comprises the plurality of signals being transmitted at a frequency greater than 1 divided by the interval.

In another aspect of the present invention, the method further comprises the interval being one video frame in duration.

In another aspect of the present invention, the method further comprises a failure being determined to have occurred when a predefined number of signals are not received.

In another aspect of the present invention, the method further comprises the step of detecting a failure being performed by the second server computer.

In another aspect of the present invention, the method further comprises the step of detecting a failure being performed by a component monitor.

In another aspect of the present invention, the method further comprises the step of detecting a failure being performed by the first server computer.

In another aspect of the present invention, the method further comprises the step of detecting a failure being performed by a kernel running on the first server computer.

In another aspect of the present invention, the method further comprises one or more applications critical to the operation of the first server computer registering with the kernel.

In another aspect of the present invention, the method further comprises a failure being determined to have occurred if the kernel recognizes one or more critical application failures.

In another aspect of the present invention, the method further comprises defining one or more failover states for a server computer.

In another aspect of the present invention, the method further comprises the failover state comprising a Primary state.

In another aspect of the present invention, the method further comprises the failover state comprising a Primary-_offline state.

In another aspect of the present invention, the method further comprises the failover state comprising a Primary_no_secondary state.

In another aspect of the present invention, the method further comprises the failover state comprising a Failed state.

In another aspect of the present invention, the method further comprises the failover state comprising a Secondary state.

In another aspect of the present invention, the method further comprises the failover state comprising a Secondary_offline state.

In another aspect of the present invention, the method further comprises the failover state comprising a Secondary_synchronizing state.

In another aspect of the present invention, the method further comprises the failover state comprising a Secondary_synchronized state.

In another aspect of the present invention, the method further comprises the failover state comprising a Secondary_no_primary state.

In another aspect, the present invention is directed to a method for data delivery comprising a first server operating on a first computer, a second server operating on the first computer, said first and second servers connected to a first network, the method comprising:

storing identical data on the first and second servers;

receiving an asset request from a user via the first network;

processing the asset request by the first and second server;

determining the operational status of the first server, wherein if a failure is not defected, transmitting the asset by the first server via the first network, if a failure is detected, transmitting the asset by the second server via the first network.

DETAILED DESCRIPTION OF THE DRAWINGS

Figure 1A:
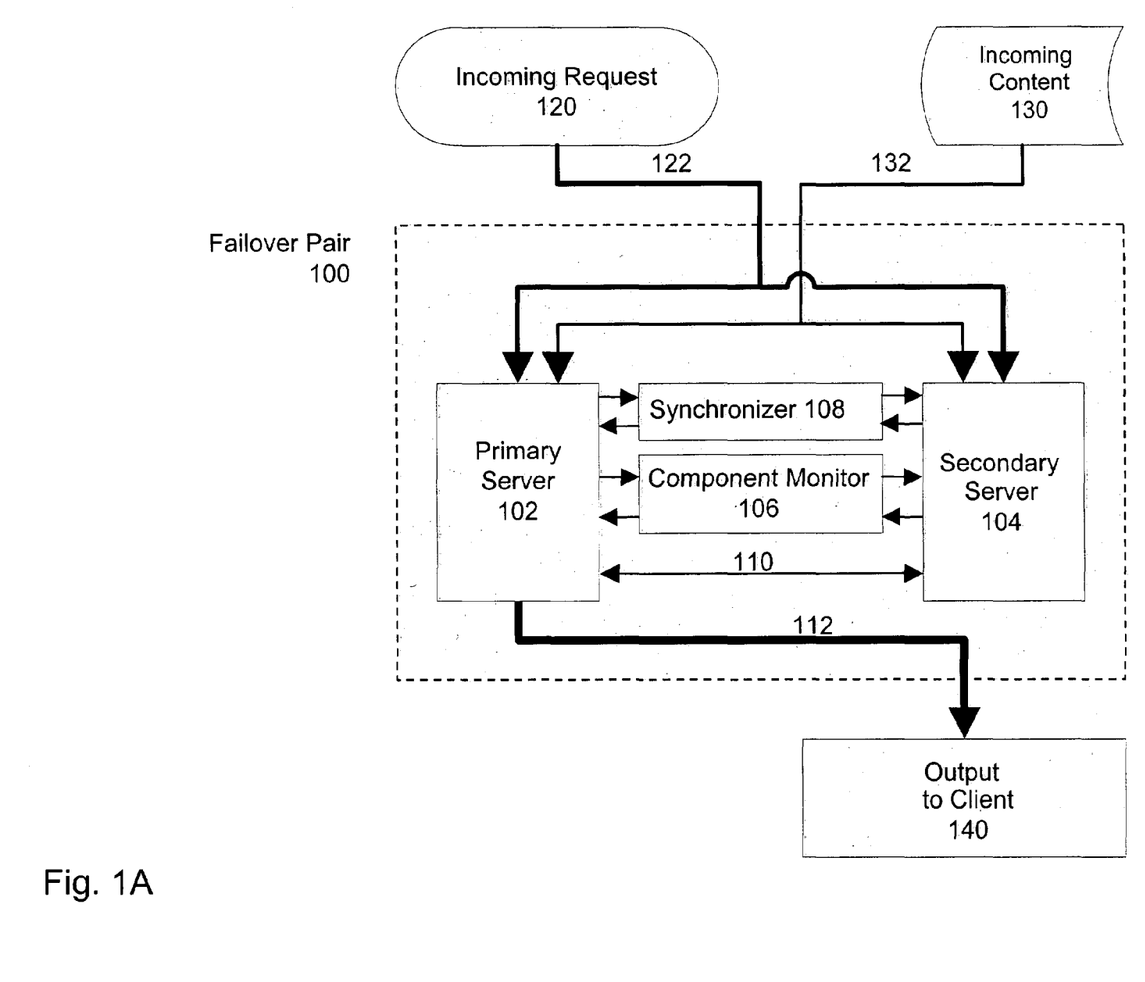
FIGS. 1A–B are block diagrams illustrating a preferred embodiment of a digital media server system with failover capability.
Figure 1B:
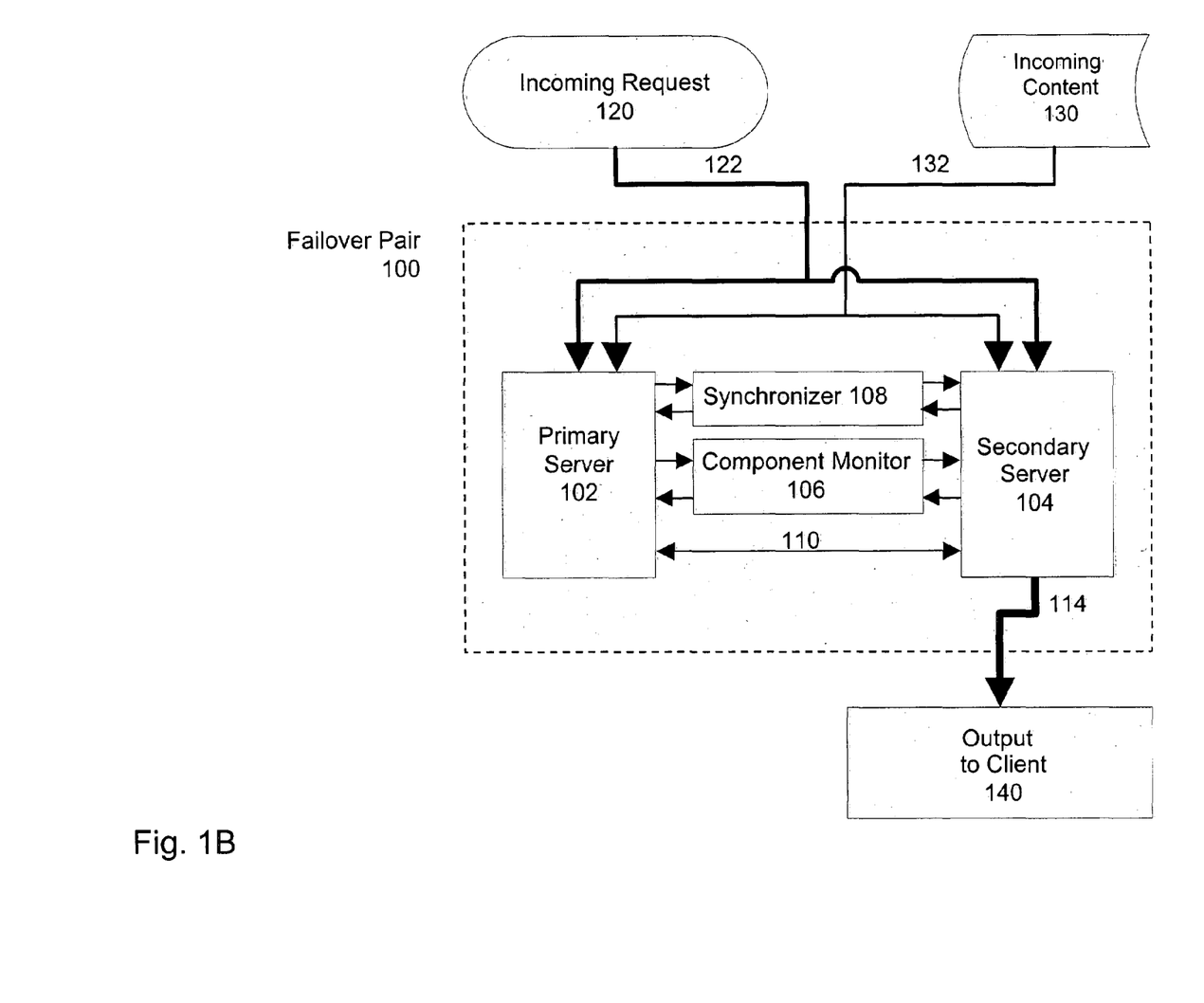

FIGS. 1A–B illustrate a preferred embodiment of a digital media server system with failover capability. As shown in FIG. 1A, the system preferably comprises a failover pair 100 that includes a first server 102 and a second server 104. At any point in time, one of the servers, is designated primary server 102 and the other is designated secondary server 104. As described below, both the primary and secondary servers process requests but only the primary server's output is delivered to the client unless a failover occurs.

In the example of FIG. 1A, server 102 is initially designated the primary server and server 104 is initially designated the secondary server. As described below, commands are preferably defined for use by a system administrator to set parameters in each system server that specify whether the server is a primary or secondary server, and to identify the second server in its failover pair. Alternatively, the system may be programmed to establish its own failover pairs.

In a preferred embodiment, both servers in the failover pair are capable of serving the same number of sessions, have access to the same content, and are adapted to provide the same service level. The servers' device configurations, however, need not be identical. In addition, during operation, operational parameters of both servers in the failover pair are synchronized (e.g., number of active sessions, the status of all active sessions, data port numbers, packet numbers, and packet send times). In the following description, the term "failover-sensitive parameters" is used to refer to configuration and other parameters of a server that must be synchronized with its failover partner to allow a secondary server to immediately take over streaming for a primary server if the primary server fails. Preferred embodiments of these parameters are described below. The task of synchronizing failover-sensitive parameters may be allocated to a synchronizer component 108, or, if desired, integrated into component monitor 106 (described below) or servers 102, 104.

In a preferred embodiment, failover pair 100 is provided with a component monitor 106 adapted to verify the operational status of components in servers 102,104. For example, component monitor 106 may be adapted to pull or push data from or to a server for purposes of evaluating the server's health. When component monitor 106 detects a failure of primary server 102, it preferably triggers a failover which transfers responsibility for delivering content to the secondary server, as described below.

In a preferred embodiment, a failover is triggered when primary server 102 cannot deliver a requested resource for any reason. For example, a failover may be triggered when the primary server is inoperative due to a power failure, hardware or software failure, or networking failure. When a failover is triggered, the secondary server begins delivering data and is preferably re-designated as the primary server at least until the original primary server is returned to operation or the malfunctioning primary server is replaced by a new server.

It should be noted that although the present description speaks primarily in terms of a single primary server and a single secondary server, the rectangle that represents a single primary server 102 in FIG. 1A may, in some embodiments, represent a first server cluster, and the rectangle that represents a single secondary server 104 in FIG. 1A may, in some embodiments, represent a second server cluster. It should also be noted that both servers in a failover pair may reside on a single physical machine, with the primary and secondary servers residing on two independent data paths.

As known in the art, the time required to deliver one discreet portion of a transmitted data type is referred to as an "interval." In the case of video-based media in the United States, Canada, and Japan, the National Television Standards Committee (NTSC) standard video format is approximately 30 frames per second. The transmission time for one video frame, i.e., one interval, is thus approximately 33 milliseconds. By contrast, in the case of video-based media in Europe, the Phase Alternate Line (PAL) or Sequential Couleurs a Memoire (SECAM) standard video format is approximately 25 frames per second. Thus, the transmission time for one video frame, i.e., one interval, is approximately 40 milliseconds. Although the following description refers primarily to the NTSC format, it should be recognized that the present system and method may be applied to other formats, such as PAL, SECAM, and others, such as formats employing 24 frames per second for film-based media.

A failover in the present system may preferably be triggered in a number of ways. In one preferred embodiment, a failover is triggered if monitoring component 106 detects a failure in primary server 102. For example, component monitor 106 may be adapted to detect loss of an interface link (e.g., if a network connection is severed). When component monitor 106 detects a malfunction in primary server 102, it notifies secondary server 104 that it should begin delivering the requested data. This notification may preferably be made by component monitor 106 itself, or via a failover switch (not shown) incorporated into the component monitor. Component monitor 106 may also be adapted to monitor the status of synchronizer 108, and network connections 110, 112, 122, and 132.

Alternatively or in addition, a failover may be triggered by primary server 102 detecting a malfunction in its own operation and transmitting a failure message to secondary server 104 or component monitor 106. For example, primary server 102 may be adapted to recognize that a hardware error will prevent access to its network interface for transmitting data, and to send a message indicating this failure to either secondary server 104 or component monitor 106.

Alternatively or in addition, the primary server may be adapted to transmit a signal (referred to herein as a "heartbeat") at a predefined frequency indicating that the primary server is operating properly. A system administrator preferably defines the heartbeat frequency in milliseconds. If, for example, the defined heartbeat frequency is 5 milliseconds, a properly operating primary server will transmit approximately 6.5 heartbeats per NTSC frame. Heartbeats may be monitored by secondary server 104, component monitor 106, or other suitable monitoring components.

In a preferred embodiment, the system administrator defines the number of heartbeats that may be missed, i.e., not detected by the secondary server or component monitor, before a failure is determined to have occurred.

FIG. 1B is a block diagram illustrating the system of FIG. 1A after a failover is triggered. As shown in FIG. 1B, when a failover is triggered, secondary server 104 takes over for primary server 102 and delivers requested content to the client via a network connection 114.

Figure 2:
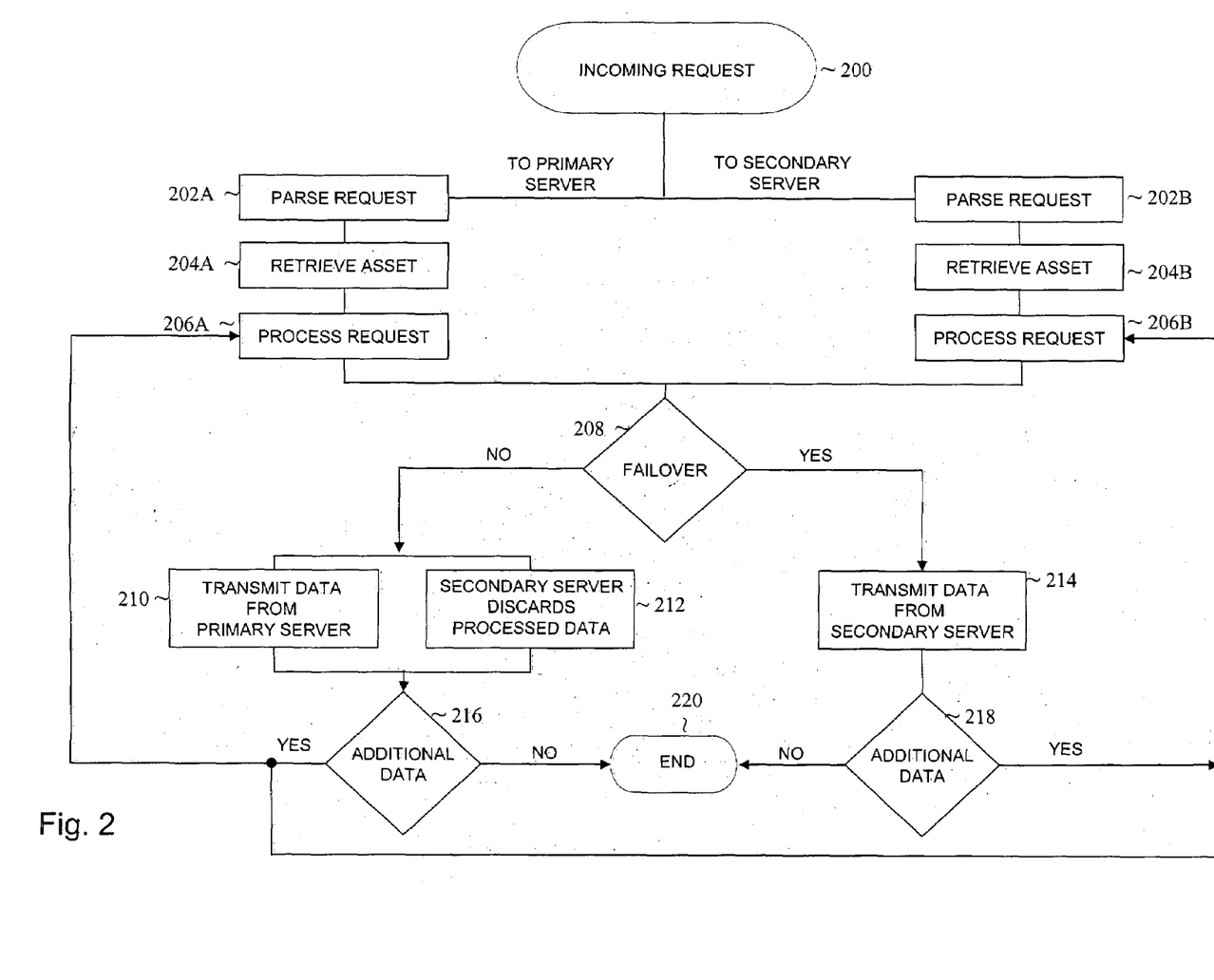
FIG. 2 is a flow chart illustrating system operation of the preferred embodiment of FIGS. 1A–B.

Operation of failover pair 100 will now be further described in connection with FIG. 2. For purposes of illustration, an interval in the following description is assumed to be equal to one NTSC video frame. As shown in FIG. 2, an incoming request 200 is simultaneously routed to both the primary server and secondary server. In a preferred embodiment, network spoofing techniques are employed to make primary server 102 and secondary server 104 appear as a single device on network 110 to facilitate simultaneous delivery of requests to both servers 102,104, as described below.

In steps 202A–B, the request is parsed by servers 102,104 to identify the requested asset. In steps 204A–B, the requested asset is retrieved from storage. In steps 206A–B, servers 102,104 begin processing the retrieved asset into video frames suitable for viewing at the client location.

In a preferred embodiment, the operational status of server 102 is verified on a continuing basis using one or more of the techniques described above. During each interval that no failure is detected (step 208=No), the video frame generated by primary server 102 for that interval is streamed to the client (step 210), and an identical video frame generated by secondary server 104 is discarded (step 212). In a preferred embodiment, this may be achieved by evaluating a "inhibit transmission" flag in the secondary server's network interface logic. When the flag is set, all packet transmissions are discarded, whereas when the flag is cleared the transmissions proceed. In step 214, unless the entire asset has been streamed (step 220), processing returns to steps 206A–B and the next video frame is prepared.

By contrast, if a failure is detected (step 208=Yes), a failover is triggered and the video frame generated by secondary server 104 is instead streamed to the client. In step 218, unless the entire asset has been streamed (step 220), processing proceeds to step 206B where the next video frame is prepared by the now-primary server 104.

In a preferred embodiment, the steps of verifying the primary server's operational status and, if necessary, initiating a failover to the secondary server are performed in less than one interval. Consequently, the failover is transparent to the client thus ensuring a satisfactory viewing experience.

FIGS. 3A–3E are composite block/flow diagrams emphasizing the timing of data delivery in a failover pair and the zero-interval failover capability of the present system and method. An interval, in the following description, is assumed to be equal to one NTSC video frame.

Figure 3A:
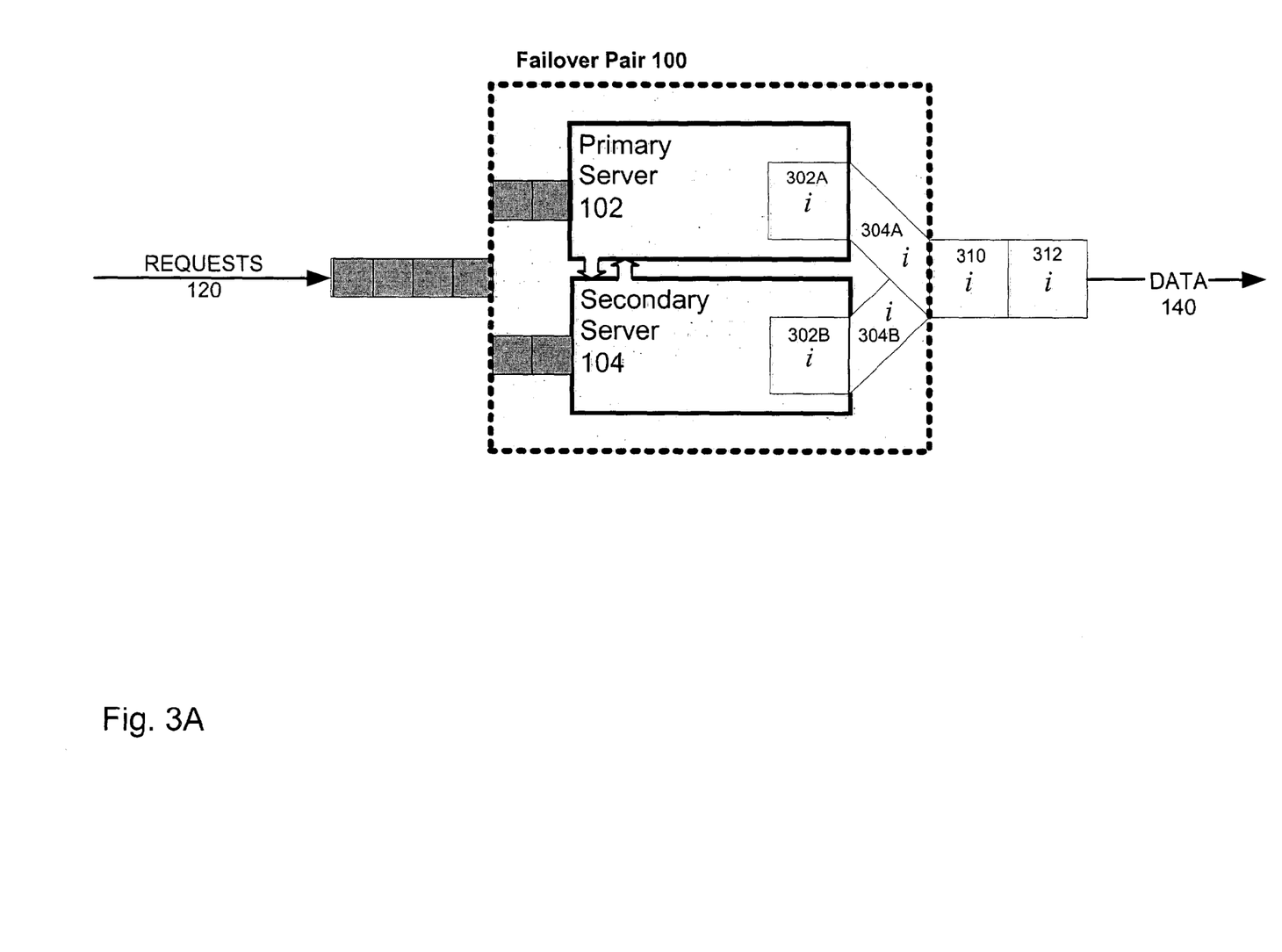
FIGS. 3A–E are composite block/flow diagrams emphasizing the timing of data delivery in a failover pair and the single-frame failover capability of the present system and method.

As shown in FIG. 3A, incoming requests are delivered to both primary server 102 and secondary server 104 in failover pair 100.

Figure 3B:
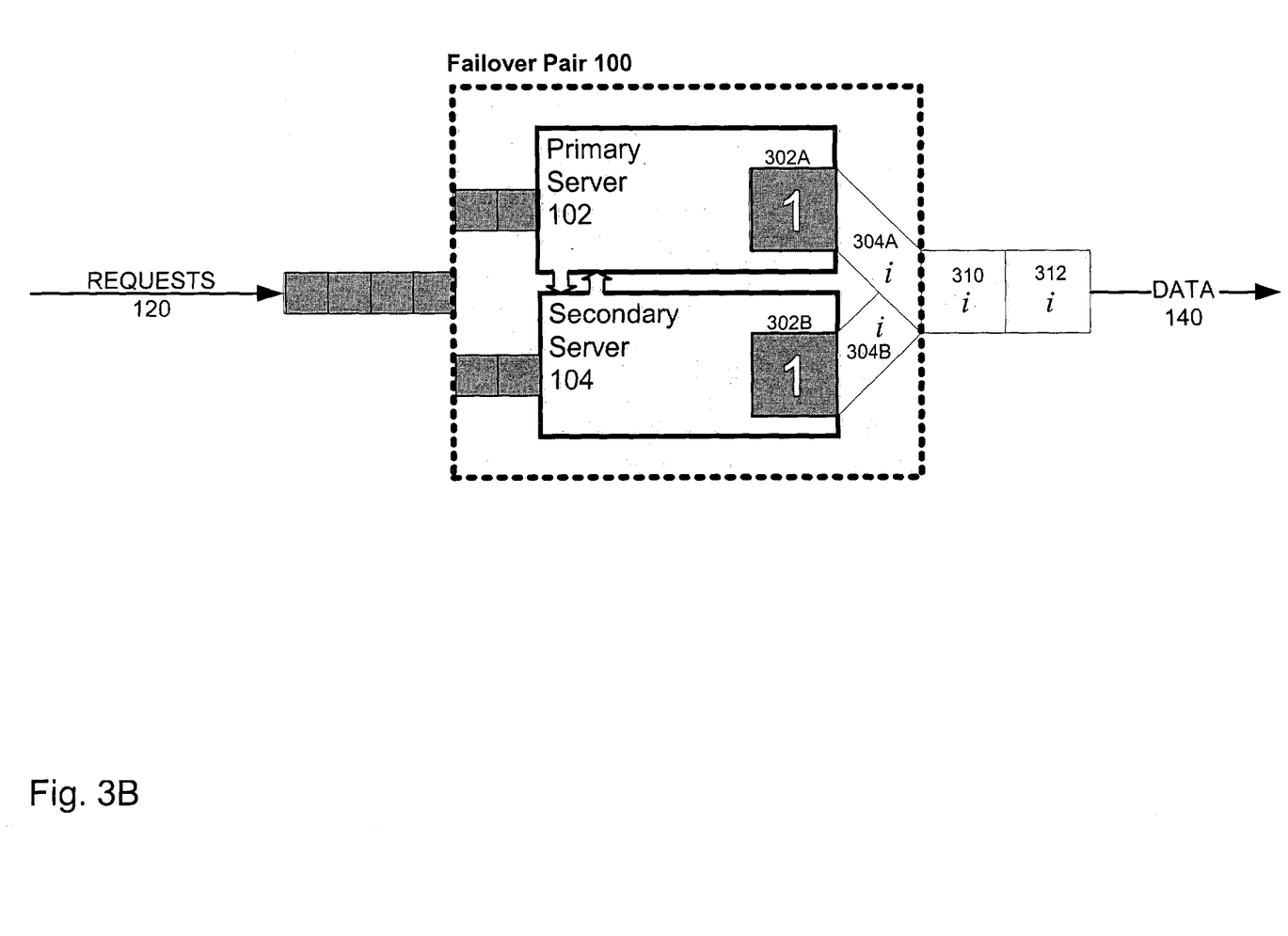

As shown in FIG. 3B, both the primary server and the secondary server respond by processing the request and preparing the first video frame (duration one interval) for delivery (302A–B).

Figure 3C:
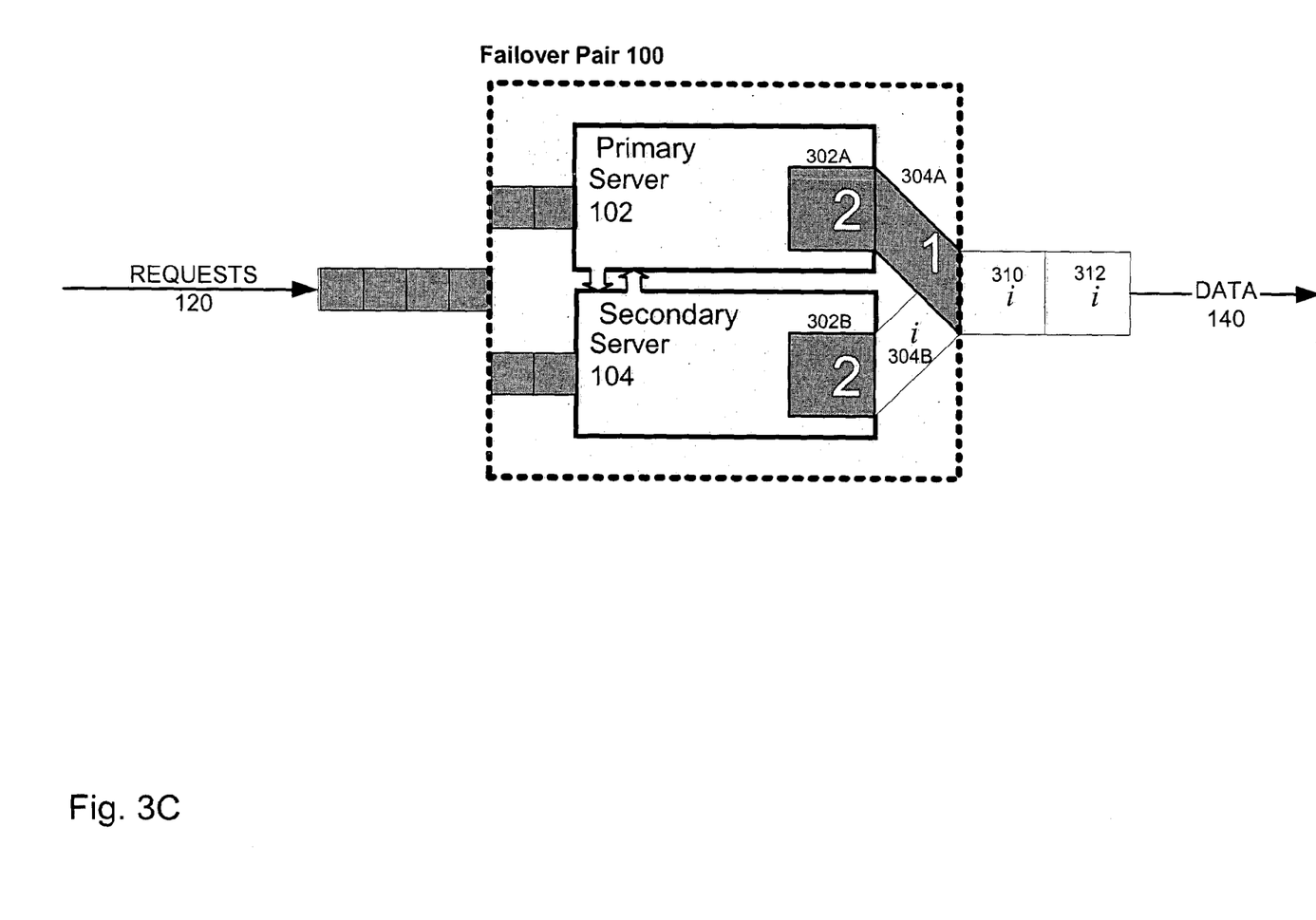
Figure 3D:
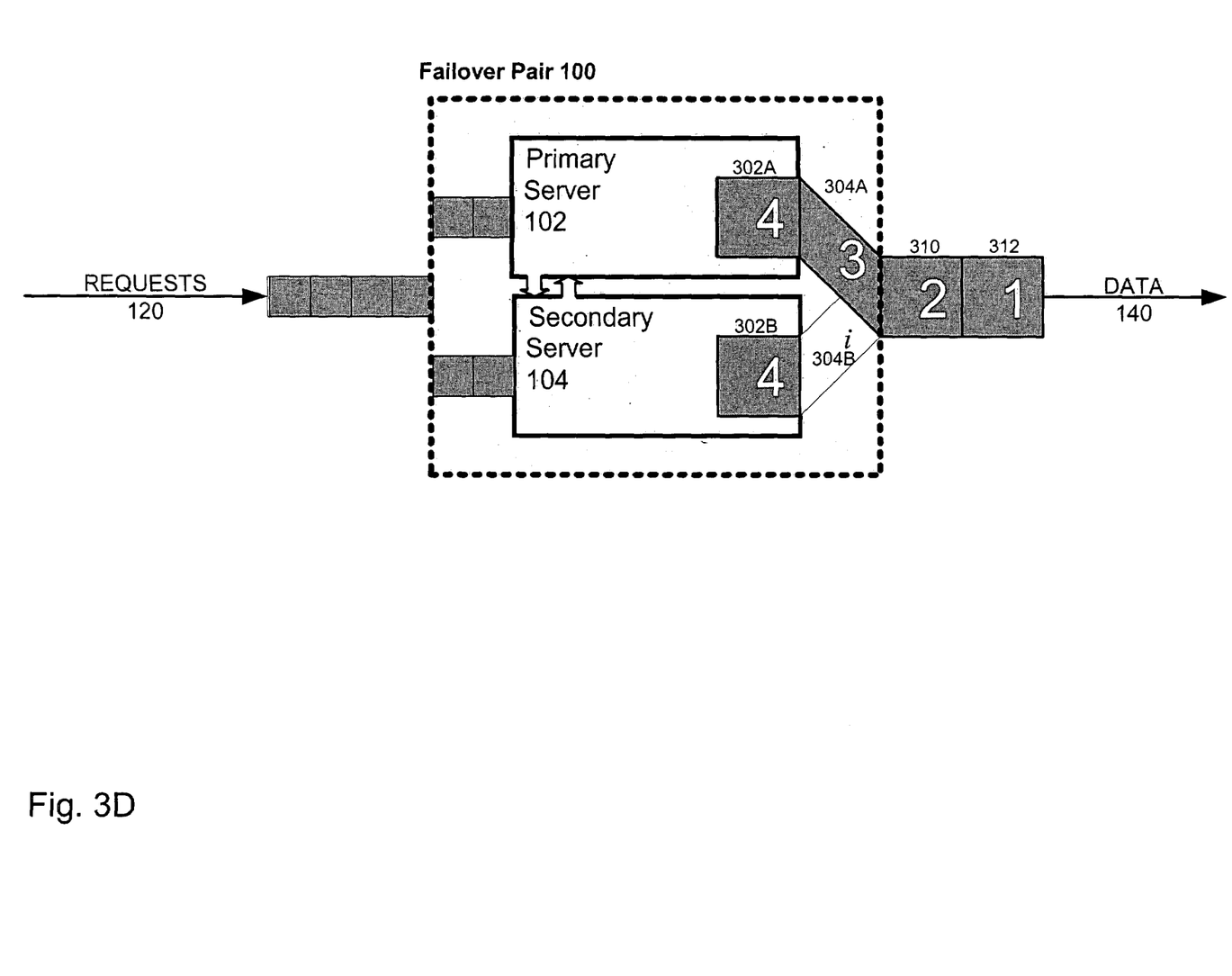

FIG. 3C illustrates that, at the end of interval 1, the primary server has transmitted the first data segment (304A), and the first data segment generated by the secondary server has been discarded (304B). In addition, both servers have prepared segment 2 (302A–B). As illustrated in FIG. 3D, the system repeatedly iterates through these steps, with the primary server transmitting each processed video frame and the secondary server discarding it.

Figure 3E:
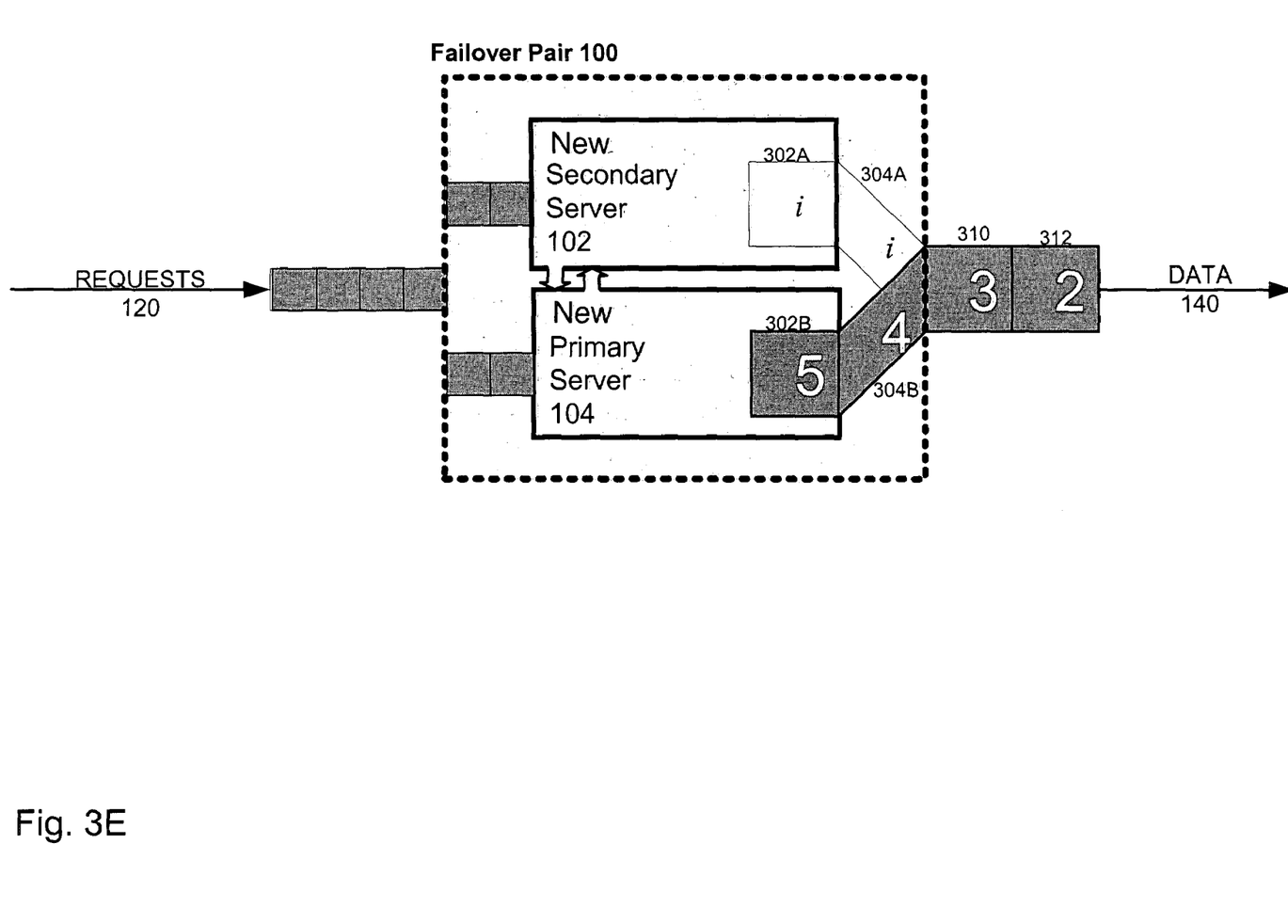

For purposes of the present example, it is assumed that a failure occurs in the primary server during the interval corresponding to data segment 4. Accordingly, a failover is initiated as shown in FIG. 3E. In this example, the secondary server has automatically been re-designated the primary server in the failover pair, and the original primary server has been re-designated as the secondary server. The new primary server (former secondary server) preferably delivers segment 4 during the current interval. Accordingly, despite the failure, no data is lost in transit to the client and the client does not directly or indirectly perceive the failure.

Figure 4:
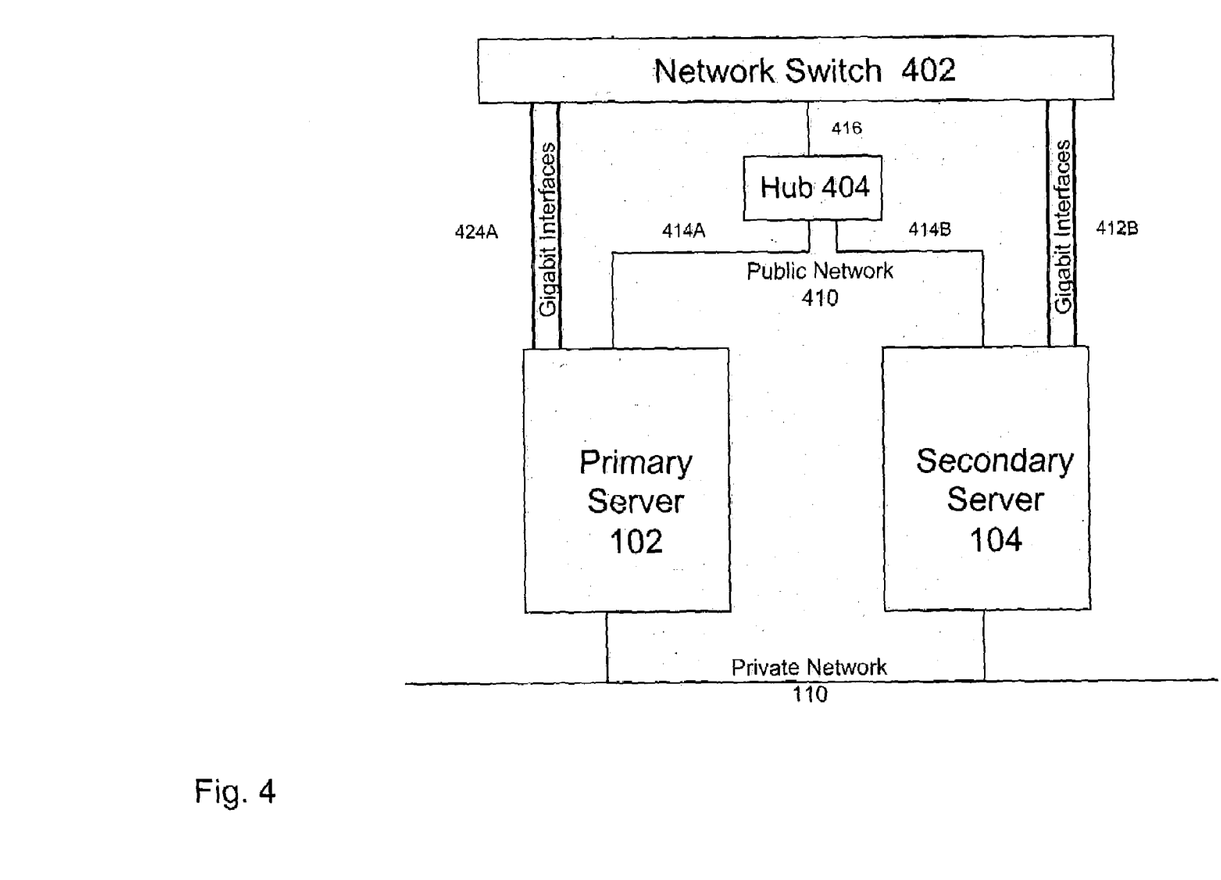
FIG. 4 is a block diagram illustrating a preferred network configuration of public and private interfaces for supporting a failover pair.

FIG. 4 is a block diagram illustrating a preferred network configuration of public and private interfaces for supporting a failover pair. Shown in FIG. 4 are gigabit interfaces 412 for transmitting streaming data to users, a network switch 402 and a hub 404. Hub 404 is preferably connected to the network switch via a network connection 416. Servers 102,104 are preferably connected over a public network to hub 404 via network connections 414. Additionally, primary server 102 and secondary server 104 are preferably connected via a private network connection 110.

The public interface on each server preferably has two IP addresses associated with it, an administration IP address (admin_IP) and a Stream IP address (stream_P). The administration IP address is preferably unique across all servers, on the network, while the stream IP address on each of the servers in a failover pair is preferably the same. This allows both the primary and secondary servers to see all control and data requests from clients. The private interface of each server is preferably assigned its own private IP address to facilitate communication over the private network.

In a preferred embodiment, each server preferably maintains two failover variables that define the server's state with respect to failover functionality: failover_type and failover_state. The failover_type variable may preferably take the following values:

FOTYPE_MASTER—indicating that the server's current designation is as a primary server;
FOTYPE_SLAVE—indicating that the server's current designation is as a secondary server;
FOTYPE_UNDEF—indicating that the server is not currently designated as either a primary or a secondary server.

The failover_state variable can preferably take the following values:

FOSTATE_LIVE—indicating that a partner exists and is online;
FOSTATE_UNDEF—indicating that the failover state is currently undefined;
FOSTATE_FAILED—indicating that a particular server is not operational.
FOSTATE_SYNCING—indicating that a synchronization is in process;
FOSTATE_SYNCED—indicating that synchronization is complete;
FOSTATE_NOPARTNER—indicating that a server has no failover partner;
FOSTATE_NONE—indicating that a particular server is offline.

In a preferred embodiment, a failover state is defined for each server that is a function of its failover_type and failover_state values. More specifically, the relationship between a server's failover state and its failover variables is preferably the following:

failover state=Primary:
failover_type=FOTYPE_MASTER; and
failover state=FOSTATE_LIVE.
failover state=Primary_Offline:
failover_type=FOTYPE_MASTER; and
failover_state=FOSTATE_NONE.
failover state=Primary_No_Secondary:
failover_type=FOTYPE_MASTER; and
failover_state=FOSTATE_NOPARTNER.
failover state=Failed:
failover_type=FOTYPE_MASTER; and
failover_state=FOSTATE_FAILED.
failover state=Secondary:
failover_type=FOTYPE_SLAVE; and
failover_state=FOSTATE_LIVE.
failover state=Secondary_Offline:
failover_type=FOTYPE_SLAVE; and
failover_state=FOSTATE_NONE.
failover state=Secondary_Synchronizing:
failover_type=FOTYPE_SLAVE; and
failover_state=FOSTATE_SYNCING.
failover state=Secondary_Synchronized:
failover_type=FOTYPE_SLAVE; and
failover state=FOSTATE_SYNCED.
failover state=Secondary_No_Primary:
failover_type=FOTYPE_SLAVE; and
failover_state=FOSTATE_NOPARTNER.

Figure 5:
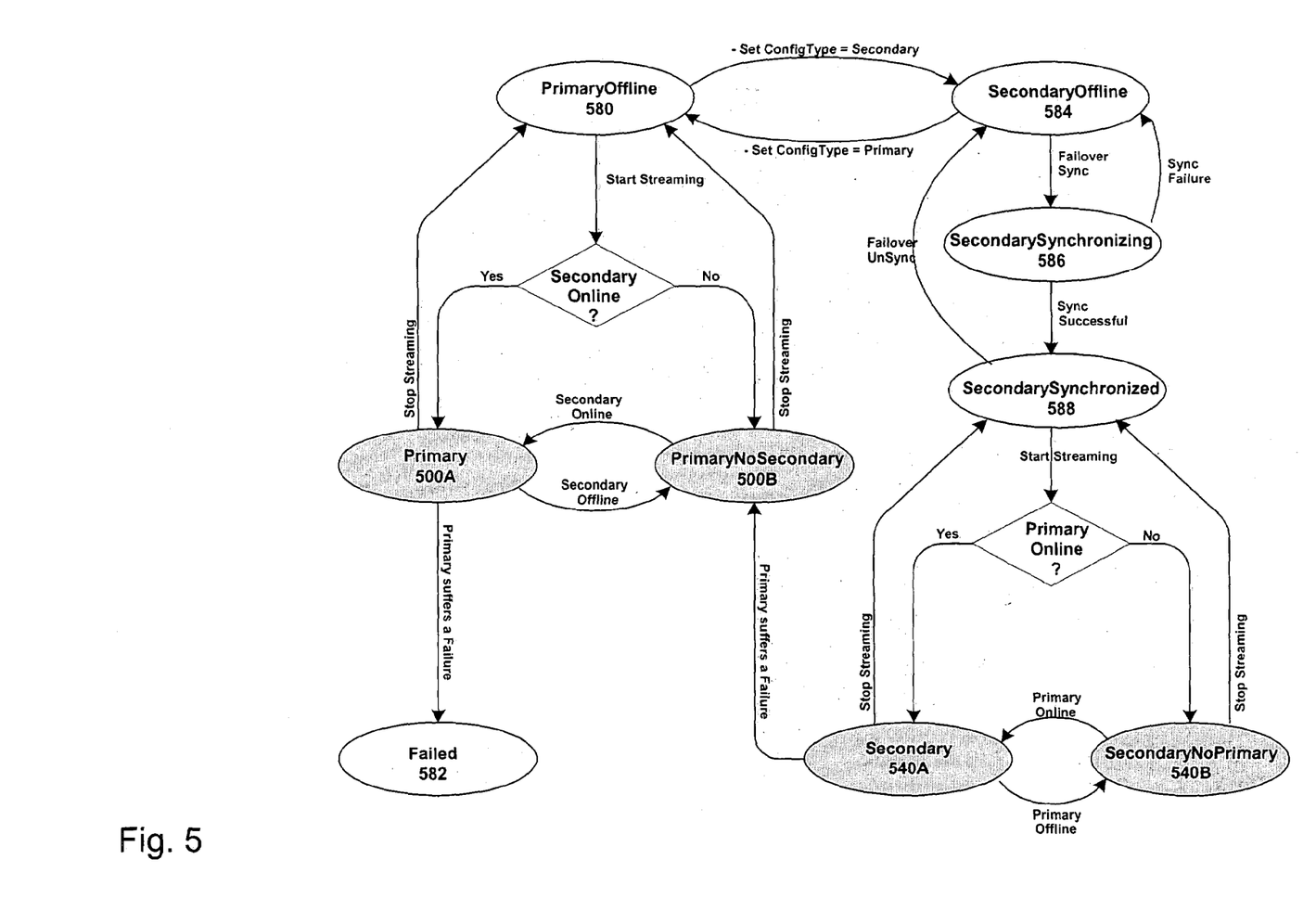
FIG. 5 is a diagram illustrating a plurality of failover states and their relationship in a preferred embodiment of the present system and method.

FIG. 5 is a state diagram illustrating these states and their relationship in a preferred embodiment. Shaded states indicate that at least one server is online (500A, 500B, 540A and 540B), while unshaded states indicate that no server is available (580, 582, 584, 586, 588). As described below, a failover state may change as a result of various events including the occurrence of a failover or the configuration, installation, or initialization of a server.

A preferred embodiment for configuring a new failover pair 100 will now be described in conjunction with FIG. 5. To begin, an administrator preferably designates one server (e.g., server 102) as a primary server using a defined set_config_type command. In addition, the administrator preferably sets both the heartbeat frequency (i.e., the frequency at which heartbeat signals will be transmitted by the primary server) and the maximum number of missed heartbeats allowed before a failure is declared. Upon completion of these configuration steps primary server 102 transitions to Primary_Offline state 580.

A start streaming command is preferably defined for bringing a server online. Since (in the present example) the secondary server has not yet been configured, when the administrator issues this command for primary server 102, it transitions to Primary_No_Secondary state 500B. At this point, primary server 102 can process requests and stream data to clients. No failover capability is available, however, since a failover partner for primary server 102 has not yet been configured.

The administrator next designates a second server (e.g., server 104) as a secondary server using the set_config_type command and specifies the secondary server's failover partner (e.g., by specifying the primary server's administration IP address and private IP address). Upon completion of these configuration steps secondary server 104 transitions to Secondary_Offline 584.

The administrator next issues a failover_sync command to synchronize the secondary server's failover-sensitive parameters with those of the primary server. The failover_sync command causes secondary server 104 to transition to Secondary_Synchronizing state 586. Successful synchronization causes the secondary server to transition to Secondary_Synchronized state 588. If the synchronization fails, the secondary server's failover state returns to Secondary_Offline 584.

The above-described synchronization preferably synchronizes a plurality of servers 102,104's parameters. Illustratively, these may include:

System time
Broadcast table (the list of currently active or scheduled sessions)
Asset list
Mount points (BASS)
Stream_Limits
MPEG_Stream_Count_Limit (the maximum number of MPEG streams)
MPEG_Bandwidth_Limit_In_KBPS (the maximum bandwidth allotted to MPEG streams)
Server_Bandwidth_Limit_In_KBPS (the maximum total bandwidth allotted)
Ports
MPEGRTSP
Failover
Failover_Heartbeat_Freq (in milliseconds)
Max_Missed_Heartbeats
Load_Balance (see below)
Load_Balance_Active
Load_Balance_Group_ID
Network
StreamIP
Stream_Mask
Routes In a preferred embodiment, these synchronization tasks are performed by the secondary server. Once the secondary server is in a synchronized secondary failover state (e.g., Secondary_Synchronized, Secondary_No_Primary, or Secondary), however, all updates to operational parameters are preferably handled via updates to the primary server. Any configuration changes made while the failover system is online are preferably synchronized across the failover partners via private network 110.

A failover_unsync command is preferably defined for transitioning the secondary server from Secondary_Synchronized state 588 to an offline state to enable administrative updates to server parameters.

Once the secondary server is in the Secondary_Synchronized state, the start_streaming command is used to bring the secondary server online. If no primary server is online, the secondary server transitions to the Secondary_No_Primary state 540B. In the present example, however, the primary server is already online when the secondary server receives the start_streaming command. Accordingly, the secondary server transitions to Secondary state 540A. Concurrently, the primary server transitions from Primary_No_Secondary 500B to Primary 500A.

Once both primary and secondary servers are online, a final synchronization preferably takes place to establish communication channels between the servers via the private network. These communication channels are used to ensure synchronization of network activity between primary and secondary servers. For example, the primary server may utilize this channel during system operation to transmit stream IDs, packet numbers, and packet send times, and to ensure synchronization with the secondary server. Furthermore, the primary server may use this channel to transmit randomly assigned UDP ports to ensure that the primary and secondary servers use the same port numbers.

In a preferred embodiment, a stop_streaming command is defined for taking a server offline. If a primary server goes offline at any time, its secondary server 104 transitions from Secondary state 540A to Secondary_No_Primary state 540B. Conversely, if a primary server comes online, its secondary server transitions from Secondary_No_Primary state 540B to Secondary state 540A. Similarly, if a secondary server goes offline at any time, its primary server 102 transitions from Primary state 500A to Primary_No_Secondary state 500B. Conversely, if a secondary server comes online, its primary server's state transitions from Primary_No_Secondary state 500B to Primary state 500A.

It should be noted that the present system and method places no restriction on the order in which primary and secondary servers are brought online. If the primary server is brought online first, it will maintain a Primary_No_Secondary state until its secondary failover partner is brought online. Similarly, if the secondary server is brought online first, it will maintain a Secondary_No_Primary state until its primary failover partner its brought online.

It should further be noted that, in the example described above where the primary server is brought online before the secondary server and consequently may begin streaming with a failover state of Primary_No_Secondary, any VOD streams from the primary server before the secondary server comes online will not be backed up by the secondary server. However, broadcast sessions running before the secondary server comes online are preferably backed up, since they will be started on the secondary server when it comes online based on the broadcast table, which is synchronized with the primary server's broadcast table.

A preferred embodiment for conducting a failover in the present system and method is now described. For purposes of illustration, it is assumed in the following description that a failover pair has been configured and brought online and that primary server 102 is in Primary state 500A and secondary server 104 is in Secondary state 540A.

As noted above, primary server 102 is preferably continuously monitored in one or more ways to permit immediate detection of server failure. For purposes of illustration it is assumed in the following description that both local monitoring by a server and heartbeat monitoring by the secondary server are implemented.

In this preferred embodiment, each server is provided with a kernel responsible for managing its server's failover_type and failover_state variables. Variable values may be set by the application layer (during, e.g., server configuration by the administrator) or by the kernel itself (e.g., when a failure is detected, as described below). In a preferred embodiment, whenever a failover_type or failover_state value changes, the kernel transmits a signal to all application processes to inform them of the change (SIGFAILOVER). Application processes may query these variables at any time, and preferably check them upon receiving a SIGFAILOVER signal. As noted, the value of these two variables are tightly coupled with the application level set_config_type designation (i.e., Primary/Secondary designation) and failover state. Mappings for these couplings are described above.

In a preferred embodiment, local monitoring by the primary server is facilitated by providing a registration feature for critical processes which allows an application to identify itself to the kernel as a critical process. As shown in FIG. 5, when a registered critical process fails (e.g., application core, kernel trap, etc.), the kernel preferably transitions the primary server to Failed state 582, and sends a prebuilt failover message to the secondary server. To accomplish this state transition, the primary server's failover_type is set to FOTYPE_FAILED. The kernel also preferably disables the primary server's processing and generation of control messages and data transmission to all clients.

In a preferred embodiment, a failover message from the primary server may be the result of any number of conditions. Illustratively, these may include:

Public Interface Failure

Gigabit Interface Failure

Disk Failure

System Software Failure

System Temperature Exceeds Operational Limits

In addition, the primary server's kernel is preferably adapted to send heartbeats at the configured frequency (Failover_Heartbeat_Freq) to the secondary server. The secondary server's kernel receives these heartbeats, expecting them at the same frequency because the systems are synchronized. If the secondary server misses more than the configured allowed heartbeats (Max_Missed_Heartbeats), the kernel initiates a failover, as described below.

A missed-heartbeat failure typically occurs when a failure is so catastrophic that the primary server is unable to transmit a failover message. Illustratively, the loss of a heartbeat may be the result of any of the following conditions:

Private Interface Failure

Power Supply Failure

System Wide Failure

Server Crash/Lockup (BSOD)

In a preferred embodiment, when a secondary server's kernel detects a failure by either missed heartbeats or by receiving a failover message from the primary server, the kernel initiates a failover by changing its failover type variable from Secondary to Primary and sending a SIG-FAILOVER signal to some or all application processes preferably including all applications that manage client connections and stream data and those handling configuration synchronization. As a result of the change to its failover type variable and the transition of primary server 102 to the Failed state, the secondary server transitions to the Primary_No_Secondary state, as shown in FIG. 5. In a preferred embodiment, the secondary server also transmits a message to the primary server, if necessary, to instruct it to cease streaming data to the client. If possible, processes on the primary server attempt to log the failure and then go into an idle mode.

As will be recognized, to ensure exact mirroring of the primary server, the secondary server preferably is not considered a separate available server in load balancing determinations such as those described in U.S. patent application Ser. No. 10/609,426, filed Jun. 27, 2003, entitled "System and Method For Digital Media Serve Load Balancing," which is hereby incorporated by reference in its entirety for each of its teachings and embodiments. Rather, the secondary server mirrors any load balance tasks that are currently assigned to the primary server. In other words, from a load balancing perspective, the primary server and secondary servers are treated as one server. Preferably, however, the secondary server does not transmit load balance data, i.e., the primary server is preferably responsible for sending out load information. It should also be noted that where the load balance (e.g., where the algorithm randomly assigns a task in the case of a load tie) and the load balancer accordingly assigns new sessions randomly, tasks randomly allocated to the primary server are preferably communicated between the primary and secondary servers to ensure identical session maintenance.

While the invention has been described in connection with specific embodiments, it is evident that numerous alternatives, modifications, and variations will be apparent to those skilled in the art in light of the foregoing description.

The invention claimed is:

1. A method for digital asset delivery in a computer network comprising a first server computer and a second server computer, the method comprising:

generating, by the first server computer, at least one first frame of said digital asset;

transmitting, by the first server computer, said at least one first frame of said digital asset;

generating, by the second server computer, an identical frame to said at least one first frame of said digital asset;

indicating by said second server computer that said identical frame is to be discarded;

determining by said second server computer that said first server computer has experienced a failure;

generating, by the second server computer, at least one subsequent frame of said digital asset, wherein said at least one subsequent frame is not accompanied by an indication that said at least one subsequent frame is to be discarded.

2. The method of claim 1, wherein the steps of:

determining by said second server computer that said first server computer has experienced a failure; and generating, by the second server computer, at least one subsequent frame of said digital asset, wherein said at least one subsequent frame is not accompanied by an indication that said at least one subsequent frame is to be discarded;

are performed within one interval.

3. The method of claim 2, wherein the interval is one video frame in duration.

4. The method of claim 1, further comprising initiating, by said second server computer, a data synchronization.

5. The method of claim 1, further comprising initiating, by said first server computer, a data synchronization.

6. The method of claim 1, wherein a synchronization component initiates data synchronization.

7. The method of claim 1, wherein the step of determining by said second server computer that said first server computer has experienced a failure comprises monitoring a plurality of signals transmitted by the first server computer during one interval.

8. The method of claim 7, wherein the plurality of signals are transmitted at a frequency greater than 1 divided by the interval.

9. The method of claim 7, wherein the interval is one video frame in duration.

10. The method of claim 7, wherein a failure is determined to have occurred when a predefined number of signals are not received.

11. The method of claim 1, further comprising detecting a failure by a component monitor.

12. The method of claim 1, further comprising detecting a failure by the first server computer.

13. The method of claim 1, further comprising detecting a failure by a kernel running on the first server computer.

14. The method of claim 13, wherein one or more applications critical to the operation of the first server computer register with the kernel.

15. The method of claim 13, wherein a failure is determined to have occurred when the kernel recognizes one or more critical application failures.

16. The method of claim 1, further comprising defining one or more failover states for a server computer.

17. The method of claim 16, wherein the failover states comprise a Primary state.

18. The method of claim 16, wherein the failover states comprise a Primary offline state.

19. The method of claim 16, wherein the failover states comprise a Primary_no_secondary state.

20. The method of claim 16, wherein the failover states comprise a Failed state.

21. The method of claim 16, wherein the failover states comprise a Secondary state.

22. The method of claim 16, wherein the failover states comprise a Secondary_offline state.

23. The method of claim 16, wherein the failover states comprise a Secondary synchronizing state.

24. The method of claim 16, wherein the failover states comprise a Secondary_synchronized state.

25. The method of claim 16, wherein the failover states comprise a Secondary_no_primary state.

26. A method for digital asset delivery in a system comprising a first server and a second server, the method comprising:
synchronizing parameters of the first and second servers;
receiving a digital asset request from a user;
processing the digital asset request by the first and second server;
monitoring, by the first server, the operational status of the first server;
monitoring, by the second server, the operational status of the first server;
if a failure in said first server is not detected, indicating, by said second server that at least a portion of the digital asset as generated by said second server is not to be delivered to said user.

27. The method of claim 26, further comprising responding, by said second server, to a detected failure in said first server by no longer indicating by said second server computer that at least a portion of the digital asset as generated by said second server computer is not to be delivered to said user.

28. The method of claim 27, wherein said responding is conducted within one interval from a time when said failure is detected.

29. The method of claim 28, wherein said one interval is one video frame in duration.

30. The method of claim 26, wherein the first and second server exist in a single computing device.

31. The method of claim 26, wherein the first and second server exist in a plurality of computing devices.

32. The method of claim 26, wherein said monitoring, by said second server, the operational status of the first server comprises monitoring a plurality of heartbeat signals transmitted by the first server computer.

33. The method of claim 32, wherein a failure is determined to have occurred when a predefined number of heartbeat signals are not received.

34. The method of claim 26, further comprising defining one or more failover states for a server.

35. The method of claim 34, further comprising identifying, by said first server, a failover state corresponding to an operational state of said first server, and communicating said failover state to said second server.

* * * * *

UNITED STATES PATENT AND TRADEMARK OFFICE
CERTIFICATE OF CORRECTION

PATENT NO. : 7,159,234 B1 Page 1 of 1
APPLICATION NO. : 10/609432
DATED : January 2, 2007
INVENTOR(S) : Craig Murphy et al.

It is certified that error appears in the above-identified patent and that said Letters Patent is hereby corrected as shown below:

Column 7,
Line 27, delete "(stream_P)" and insert -- (stream_IP) --.

Signed and Sealed this

Thirty-first Day of July, 2007

JON W. DUDAS
*Director of the United States Patent and Trademark Office*